(12) United States Patent
Le Jeune et al.

(10) Patent No.: US 9,581,189 B2
(45) Date of Patent: Feb. 28, 2017

(54) BALL-AND-SOCKET JOINT MEMBER

(71) Applicant: SKF Aerospace France, Saint-Vallier (FR)

(72) Inventors: Gwenole Yves Le Jeune, Saint Sorlin en Valloire (FR); Yves Maheo, Anneyron (FR); Michel Seneclauze, Chavanay (FR)

(73) Assignee: SKF AEROSPACE FRANCE, Saint-Vallier-sur-Rhone (FR)

( * ) Notice: Subject to any disclaimer, the term of this patent is extended or adjusted under 35 U.S.C. 154(b) by 458 days.

(21) Appl. No.: 13/953,816

(22) Filed: Jul. 30, 2013

(65) Prior Publication Data

US 2014/0030007 A1    Jan. 30, 2014

(30) Foreign Application Priority Data

Jul. 30, 2012 (FR) .................................... 12 57384

(51) Int. Cl.

| F16C 11/06 | (2006.01) |
| F16C 23/08 | (2006.01) |
| F16C 19/18 | (2006.01) |
| F16C 33/60 | (2006.01) |

(52) U.S. Cl.
CPC ...... *F16C 11/0666* (2013.01); *F16C 11/0614* (2013.01); *F16C 19/183* (2013.01); *F16C 23/086* (2013.01); *F16C 33/605* (2013.01); *F16C 2202/04* (2013.01); *F16C 2204/72* (2013.01); *Y10T 403/32672* (2015.01)

(58) Field of Classification Search
CPC .............. F16C 11/0604; F16C 11/0609; F16C 11/0614; Y10T 403/32631; Y10T 403/32672
See application file for complete search history.

(56) References Cited

U.S. PATENT DOCUMENTS 2,641,492 A  *  6/1953  Flumerfelt .......... F16C 11/0604
                                                    403/117
2,675,281 A     4/1954  Heim
2,678,246 A     5/1954  Potter
(Continued)

FOREIGN PATENT DOCUMENTS

JP    2007-092856 A    4/2007
JP    4749279        *  8/2011 .............. F16C 11/06

OTHER PUBLICATIONS

French Search Report, dated Mar. 27, 2013, which issued during the prosecution of French Patent Application No. 1257384, to which the present application claims priority.

*Primary Examiner* — Michael P Ferguson
(74) *Attorney, Agent, or Firm* — Troutman Sanders LLP

(57) ABSTRACT

The ball-and-socket joint member includes an inner ring, of a general shape of revolution around a first axis, having an outer surface provided with an inner raceway, an outer ring, of a general shape of revolution around a second axis, having an inner surface provided with an outer raceway, and at least one row of balls aligned circumferentially, extending radially between the inner raceway and the outer raceway. The outer surface of the inner ring comprises a portion with a generally truncated sphere shape, forming the inner raceway. The inner surface of the outer ring comprises, for each row of balls, a groove of complementary shape to that of the balls of this row, said groove forming the outer raceway.

3 Claims, 2 Drawing Sheets

(56) References Cited

U.S. PATENT DOCUMENTS

| | | | | | |
|---|---|---|---|---|---|
| 2,767,037 | A | * | 10/1956 | Williams | F16C 23/086 384/482 |
| 4,183,687 | A | * | 1/1980 | Bramwell | F16C 39/02 403/11 |
| 5,507,580 | A | * | 4/1996 | Dezzani | C21D 9/40 384/492 |
| 7,445,399 | B2 | * | 11/2008 | Dunn et al. | F16C 11/0614 403/119 |
| 2011/0182539 | A1 | * | 7/2011 | Kolar | F16C 23/086 384/488 |

\* cited by examiner

BALL-AND-SOCKET JOINT MEMBER

CROSS-REFERENCE TO RELATED APPLICATION

The present application claims priority to French Patent Application No. 1257384 filed Jul. 30, 2012. This application is incorporated by reference in its entirety.

FIELD OF THE INVENTION

This invention relates to an improved ball-and-socket joint member. Such a joint member is also referred to as a "self-aligning ball bearing".

BACKGROUND

A ball-and-socket joint member is already known from prior art, for example that designated under the reference CN6M, marketed by the SKF company. Such a ball-and-socket joint member usually includes an inner ring, of a general shape of revolution around a first axis, having an outer surface provided with an inner raceway, an outer ring, of a general shape of revolution around a second axis, having an inner surface provided with an outer raceway, at least one row of balls aligned circumferentially, generally two rows of balls, extending radially between the inner raceway and the outer raceway.

In this description, the terms "inner" and "outer" are considered according to the radial positions in relation to the first, respectively to the second, axis. In particular, when the first and second axes are confounded, the inner ring, respectively the inner raceway, is closer to the axes than the outer ring, respectively the outer raceway. Moreover, a surface is said to be inner when it is turned towards the axes, and outer when it is turned away from the axes.

Such a joint member authorises a movement of rotation of the outer ring around the second axis, in relation to the inner ring, or, respectively, a movement of rotation of the inner ring around the first axis, in relation to the outer ring.

The joint member also authorises a relative movement referred to as "swivelling", corresponding to a rotation of the outer ring in relation to the inner ring around any axis (referred to as "swivel axis") perpendicular to the first axis, or, respectively, to a rotation of the inner ring in relation to the outer ring around any swivel axis perpendicular to the second axis.

It seems that, in such a ball-and-socket joint member, the torque exerted during a swivelling movement on the outer ring is generally high, which results in wearing of this outer ring.

The invention in particular has for purpose to overcome this disadvantage, by providing an improved ball-and-socket joint member, wherein the friction and the swivelling torques applied to the outer ring are reduced.

SUMMARY

To this effect, the invention in particular has for purpose a ball-and-socket joint member, having an inner ring, of a general shape of revolution around a first axis, having an outer surface provided with an inner raceway,
an outer ring, of a general shape of revolution around a second axis, having an inner surface provided with an outer raceway,
at least one row of balls aligned circumferentially, extending radially between the inner raceway and the outer raceway, characterised in that
the outer surface of the inner ring comprises a portion with a generally truncated sphere shape, forming the inner raceway, and
the inner surface of the outer ring comprises, for each row of balls, a groove of complementary shape to that of the balls of this row, said groove forming the outer raceway.

Due to the spherical shape of the inner raceway, the swivelling movement is carried out by ball bearings on this spherical raceway. As such, the swivelling torque is applied on the inner ring, not on the outer ring. However, as the inner ring is closer to the swivel axis than the outer ring, the swivelling torque applied on the inner ring is less than a swivelling torque applied to an outer ring.

Contrary to a ball-and-socket joint member from prior art, the contact of the balls on the spherical inner raceway is punctual, to the extent that the friction between these balls and this inner raceway is low during a swivelling movement. Indeed, a joint member from prior art had a surrounding elliptical contact between the inner and outer rings, which therefore generated a higher torque.

Moreover, the outer raceway has the shape of a groove complementary to the shape of the balls. This outer raceway is in particular intended to guide the balls during a movement of rotation of the outer ring around the second axis. Due to the shape of the groove complementary to the shape of the balls, the contact surface between this groove and these balls is relatively high, to the extent that the contact pressure on this outer raceway, distributed over the entire contact surface, is reduced.

All of these characteristics make it possible to increase the service life of the ball-and-socket joint member, by transferring the sizing contact pressures of the bearing onto the most resistant material, i.e. the roller bearing steel of the inner ring. Furthermore, due to the reduced stress applied to the joint member, it is possible to simplify the thermal treatments required to apply this joint member, and also to suppress a step of cadmium plating during the manufacture of this joint member.

Besides, due to the reduced stress, at least one of the inner and outer rings is optionally made of stainless steel, having a hardness lower than 58 HRC. Such steel is economically advantageous, and is resilient against corrosion, since it contain a low amount of carbon.

A ball-and-socket joint member according to the invention can further have one or several of the following characteristics, taken individually or in any technically possible combinations.

The ball-and-socket joint member includes two rows of balls, arranged symmetrically in relation to a plane perpendicular to the second axis, passing through a top of the truncated sphere of the outer surface of the inner ring.

The inner ring has a sleeve of a general shape of revolution around a first axis, an element in the shape of a truncated sphere at the first and second ends, integral with the sleeve, forming the inner raceway of the inner ring, and first and second annular elements, stamped on either side of the spherical element on the sleeve, having an outer radial dimension that is greater than or equal to the outer radial dimension of the spherical element at its first or second end.

When the inner and outer rings are arranged in such a way that the first and second axes are confounded, the inner ring has a dimension in the longitudinal direction of the axes that is greater than the dimension of the outer ring in this same longitudinal direction.

One of the inner or outer rings carries an element for limiting a rotation around any swivel axis perpendicular to the first or second axes, intended to form an abutment that opposes the movement of the inner or outer ring when it is displaced in rotation around any swivel axis.

The invention further relates to an end fitting for a control linkage, on particular flight controls for an aircraft, characterised in that it comprises a ball-and-socket joint member such as defined hereinabove, and in that it comprises a rod, for example a connecting rod, integral with the outer ring, and a shaft integral with the inner ring.

BRIEF DESCRIPTION OF THE DRAWINGS

The invention shall be better understood when reading the following description, provided solely by way of example and made in reference to the annexed figures among which.

DETAILED DESCRIPTION

Figure 1:
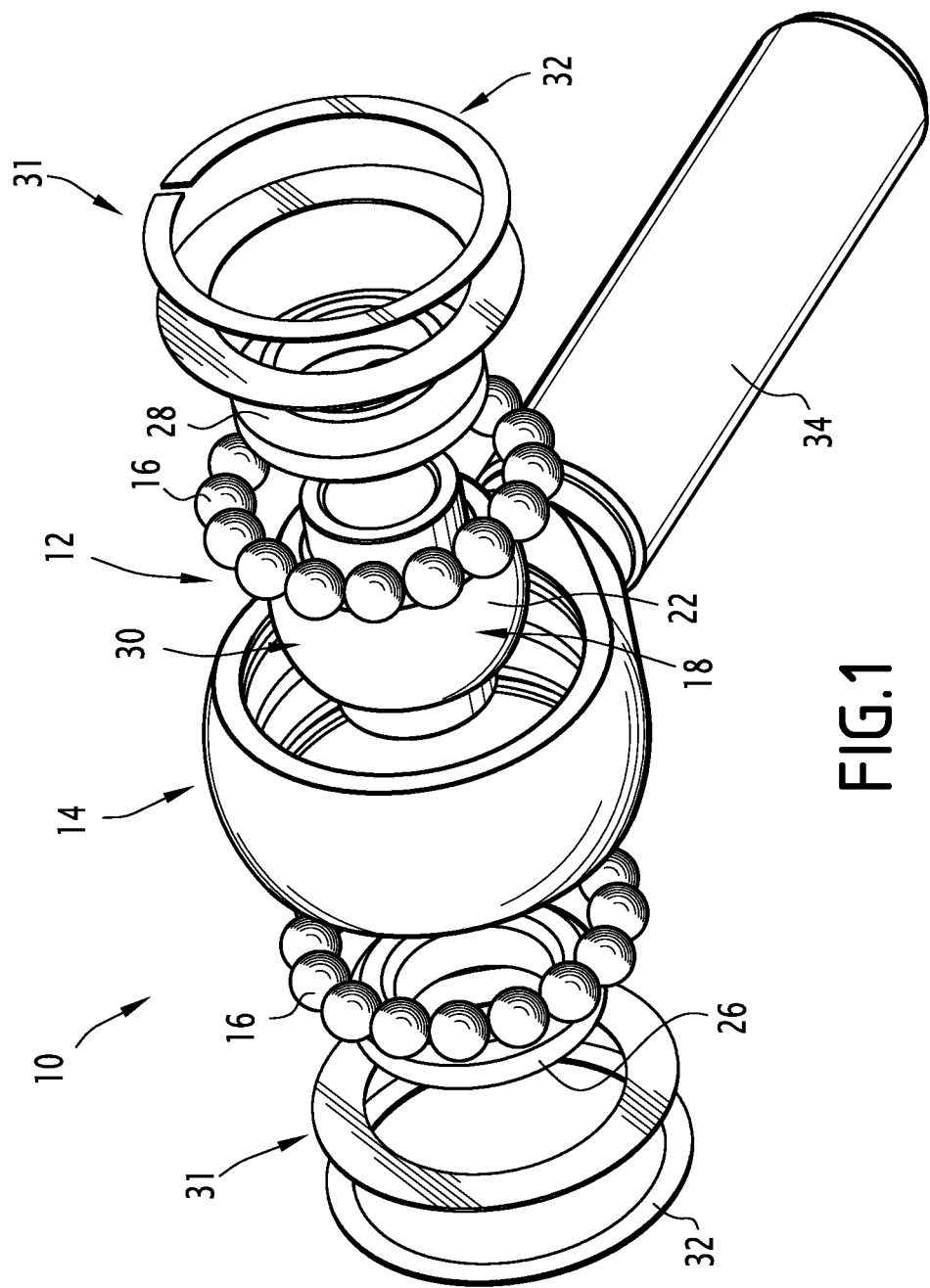
FIG. 1 is an exploded perspective view of a ball-and-socket joint member according to an example embodiment of the invention.

The figures show a ball-and-socket joint member 10. This joint member 10 has an inner ring 12, an outer ring 14, and at least one row of balls 16 aligned circumferentially, each ball 16 extending radially between the inner ring 12 and the outer ring 14.

Advantageously, at least one of the inner 12 and outer 14 rings is made of stainless steel, preferentially having a hardness lower than 58 HRC. Such a steel is economically advantageous, and is resilient against corrosion, since it contain a low amount of carbon.

The inner ring 12 has a general shape of revolution around a first axis X, having a substantially cylindrical inner surface 12A and an outer surface 12B provided with an inner raceway 18 for the balls 16.

Figure 2:
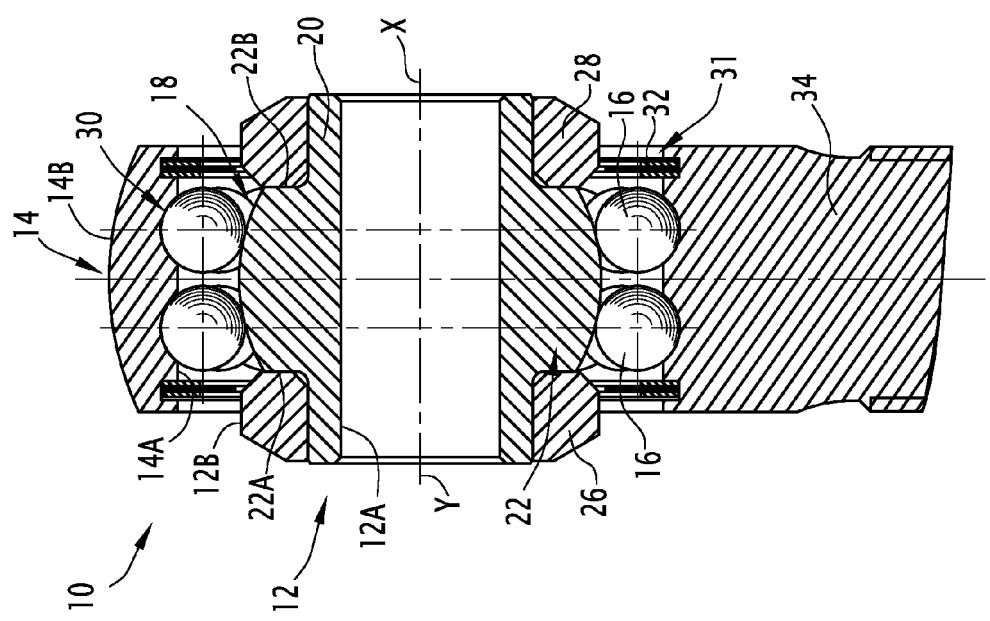
FIG. 2 is a transversal cross-section view of the ball-and-socket joint member of FIG. 1.

As is in particular shown in FIG. 2, the inner ring 12 is formed from a sleeve 20, of a general shape of revolution around the first axis X, as well as of an element 22 in the shape of a truncated sphere at the first 22A and second 22B ends in the direction of the first axis X.

This spherical element 22 is integral with the sphere 20, and forms the inner raceway 18 of the inner ring 12.

In the example shown, the spherical element 22 is a single part with the sleeve 20. Alternatively, it can be added, for example by stamping, on this sleeve 20.

Advantageously, the inner ring 12 further includes first 26 and second 28 annular elements, stamped onto the sleeve 20 on either side of the spherical element 22, each in contact with one of the respective first 22A and second 22B ends of the spherical element 22. Preferably, each of these first 26 and second 28 annular elements has an outer radial dimension that is greater than or equal to the outer radial dimension of the spherical element 22 at its corresponding first 22A or second 22B end.

The outer ring 14 has a general shape of revolution around a second axis Y. This outer ring 14 has an inner surface 14A provided with at least one outer raceway 30 for the balls 16, and an outer surface 14B.

In particular, the inner surface 14A is provided with an outer raceway 30 for each row of balls 16. Each outer raceway 30 then has the shape of a groove complementary to the shape of the balls 16 of the corresponding row.

In the example shown, the ball-and-socket joint member 10 has two rows of balls 16, arranged symmetrically in relation to a plane perpendicular to the second axis Y, and passing through a top of the spherical element 22, said top being the point on this sphere which is the farthest away from the second axis Y.

The shapes of the inner 18 and outer 30 raceways authorise various movements of rotation of the inner 12 and outer 14 rings in relation to one another.

In particular, the inner ring 12 is mobile in rotation around the first axis X in relation to the outer ring 14 and, reciprocally, the outer ring 14 is mobile in rotation around the second axis Y in relation to the inner ring 12.

Moreover, the outer ring 14 is mobile according to a movement referred to as "swivelling", i.e. mobile in rotation in relation to the inner ring 12 around any axis (referred to as swivel axis) perpendicular to the first axis X. Reciprocally, the inner ring 12 is mobile according to a "swivelling" movement, in rotation in relation to the outer ring 14 around any axis (referred to as swivel axis) perpendicular to the second axis Y.

Figure 3:
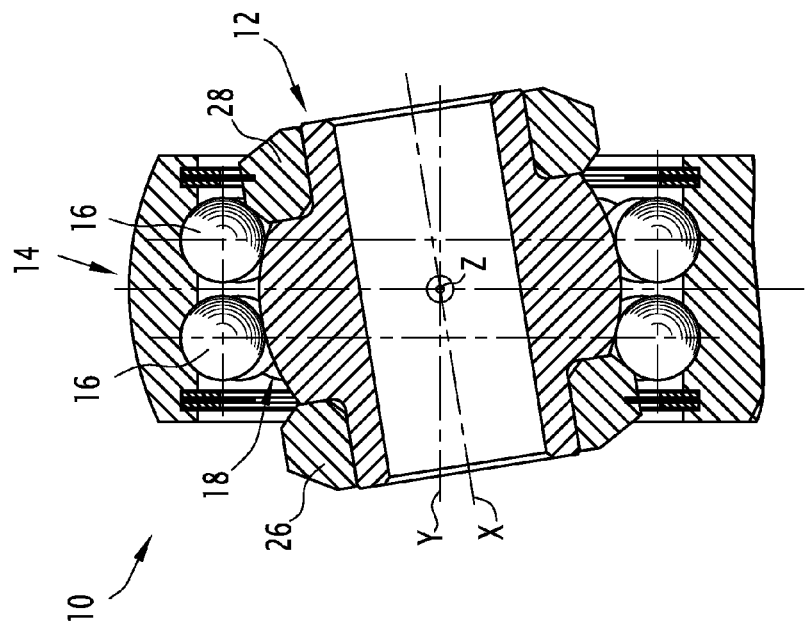
FIG. 3 is a view similar to FIG. 2 of the ball-and-socket joint member, to which a swivelling movement is applied.

In FIG. 2, the first X and second Y axes are shown as confounded, with the swivel angle being zero. On the other hand, in FIG. 3, the first X and second Y axis are shown offset by a swivel angle around a swivel axis Z perpendicular to the second axis Y, the inner ring 12 having been subjected to a rotation of this swivel angle around the swivel axis Z, in relation to the outer ring 14.

Advantageously, the first 26 and second 28 annular elements of the inner ring 12 form elements that limit swivelling movements, i.e. of any rotation around a swivel axis. In particular, these elements 26, 28 form abutments that oppose the movement of the inner ring 12 when the latter is displaced in rotation around any swivel axis, as is shown in particular in FIG. 3.

In accordance with the example described, the annular elements of limitation 26, 28 define a maximum swivel angle by forming an abutment for the balls 16, these balls 16 abutting against one of the annular elements 26, 28 when the swivel angle reaches its limit value.

Alternatively, it can be provided to arrange an element for limiting on the outer ring 14, intended to come into contact with the inner ring 12 in order to limit the swivelling movement.

In accordance with the embodiment shown, the ball-and-socket joint member 10 is said to be "with a wide inner ring", i.e., when the inner 12 and outer 14 rings are arranged in such a way that the first X and second Y axes are confounded, as is shown in FIG. 2, the inner ring 12 has a dimension in the longitudinal direction of the axes X and Y that is greater than the dimension of the outer ring 14 in this same longitudinal direction. Such a wide inner ring facilitates the assembly and disassembly of the joint member 10.

Advantageously, the joint member 10 includes means for sealing 31, comprising gaskets 32 arranged on either side of the balls 16 in the longitudinal direction defined by the second axis Y, and extending radially between the inner ring 12 and the outer ring 14. Each gasket 32 has a general annular shape, having an outer edge integral with the inner surface 14A of the outer ring 14, and an inner edge forming a lip in contact with the outer surface 12B of the inner ring 12. These gaskets 32 are for example made from rubber.

Such a ball-and-socket joint member 10 is for example intended to provide an end fitting for a control linkage, in particular a flight control linkage for aircraft, such as a helicopter. In this case, the end fitting comprises a rod 34 shown in FIGS. 1 and 2, for example a connecting rod, integral with the outer ring 14, and a shaft (not shown) integral with the inner ring 12, by passing through the space delimited by its inner surface 12A.

Note that the invention is not limited to the embodiment described hereinabove, but can have various alternatives without leaving the scope of the claims.

The invention claimed is:

1. An end fitting for a flight control linkage for an aircraft, comprising a ball-and socket joint member, comprising:
    an inner ring, of a general shape of revolution around a first rotation axis, comprising an outer surface provided with an inner raceway,
    an outer ring, of a general shape of revolution around a second rotation axis, concentrically disposed around the inner ring and comprising an inner surface provided with an outer raceway,
    at least one row of balls aligned circumferentially, extending radially between the inner raceway and the outer raceway,
    wherein:
        the inner surface of the outer ring comprises, for each row of balls, a corresponding annular groove of a shape complementary to that of the balls of a respective row, said grooves collectively forming the outer raceway,
        at least one of the inner and outer rings is made of stainless steel with a hardness lower than 58 HRC, and
        the end fitting comprises a rod, integral with the outer ring, and a shaft integral with the inner ring, and wherein the inner ring comprises:
        a sleeve of a general shape of revolution around the first axis,
        an element in the shape of a sphere truncated at the first and second ends thereof, centrally disposed on and integral with the sleeve, the outer surface thereof forming the inner raceway of the inner ring, and
        first and second annular abutment elements, each stamped on the sleeve at a respective first or second axial side of the spherical element, having an outer radial dimension that is greater than or equal to an outer radial dimension of the spherical element at its first or second end, the first and second annular abutment elements forming abutments that oppose the movement of the inner ring when the outer ring is displaced in rotation around any swivel axis perpendicular to the first or second axes, and
        the end fitting for a control linkage comprises first and second gaskets, each arranged on a respective first or second outer axial side of the rows of balls in a longitudinal direction defined by the second axis, and extending radially between the inner ring and the outer ring, each gasket having a general annular shape, having an outer edge integral with the inner surface of the outer ring, and an inner edge forming a lip in contact with the first or second abutment element, respectively.

2. The end fitting according to claim 1, wherein the ball-and-socket joint member comprises two rows of balls, arranged symmetrically in relation to a plane perpendicular to the second axis, passing through a top of the truncated sphere of the outer surface of the inner ring.

3. The end fitting according to claim 1, wherein, when the inner and outer rings are arranged in such a way that the first and second axes are confounded, the inner ring comprises a dimension in the longitudinal direction of the axes that is greater than the dimension of the outer ring in this same longitudinal direction.

* * * * *